United States Patent
Mitsuo (10) Patent No.: US 8,306,198 B2
(45) Date of Patent: *Nov. 6, 2012

(54) PRIVATE BRANCH EXCHANGE

(75) Inventor: Sadaka Mitsuo, Fukuoka (JP)

(73) Assignee: Panasonic Corporation, Osaka (JP)

( * ) Notice: Subject to any disclaimer, the term of this patent is extended or adjusted under 35 U.S.C. 154(b) by 921 days.

This patent is subject to a terminal disclaimer.

(21) Appl. No.: 12/273,781

(22) Filed: Nov. 19, 2008

(65) Prior Publication Data

US 2009/0074160 A1  Mar. 19, 2009

Related U.S. Application Data (63) Continuation of application No. 11/059,272, filed on Feb. 16, 2005, now Pat. No. 7,471,778, which is a continuation of application No. 09/948,267, filed on Sep. 6, 2001, now Pat. No. 6,952,467.

(30) Foreign Application Priority Data

Sep. 7, 2000 (JP) ................... 2000-271102

(51) Int. Cl.
 *H04M 11/00* (2006.01)
(52) U.S. Cl. .............. 379/93.24; 379/100.06; 379/88.12
(58) Field of Classification Search ............... 379/88.12, 379/93.24–93.25, 100.06, 100.08, 100.12; 358/402, 440, 445; 370/352, 400; 709/206, 709/207
See application file for complete search history.

(56) References Cited

U.S. PATENT DOCUMENTS

| | | | | |
|---|---|---|---|---|
| 4,837,798 A * | 6/1989 | Cohen et al. | ............... | 379/88.14 |
| 5,561,703 A * | 10/1996 | Arledge et al. | ............... | 340/7.29 |
| 5,944,786 A | 8/1999 | Quinn | | |
| 6,212,265 B1 | 4/2001 | Duphorne | | |
| 6,389,276 B1 * | 5/2002 | Brilla et al. | ................... | 455/413 |
| 6,393,017 B1 | 5/2002 | Galvin et al. | | |
| 6,396,907 B1 * | 5/2002 | Didcock | ................... | 379/88.17 |
| 6,498,835 B1 | 12/2002 | Skladman et al. | | |
| 6,671,355 B1 | 12/2003 | Spielman et al. | | |

FOREIGN PATENT DOCUMENTS

| | | |
|---|---|---|
| JP | 11-205457 | 7/1999 |
| JP | 2001-326730 | 11/2001 |
| JP | 2001-326739 | 11/2001 |

* cited by examiner

*Primary Examiner* — Melur Ramakrishnaiah
(74) *Attorney, Agent, or Firm* — RatnerPrestia (57) ABSTRACT

A private branch exchange (PBX) capable of transmitting and receiving an E-mail over a network is provided. The PBX includes an interface for communicating with the network, an E-mail server for receiving and storing the E-mail; an extension interface for exchanging a communication signal including an audio signal and control signal with an extension telephone, a database for storing a destination address of an E-mail and an extension number corresponding to the address, an examining unit for examining whether or not an mailing address contained in an E-mail received at the E-mail server from the network is registered in the database, and a controller for sending a notice of the reception of the E-mail the extension telephone of the extension number allocated to the mailing address of the E-mail when the examining unit judges that the mailing address of the E-mail is registered in the database.

7 Claims, 11 Drawing Sheets

| Address | Destination 1 | Destination 2 | Attached File Destination | Individual Delivery |
|---|---|---|---|---|
| Aaa.A.Co.Jp | EXT 102 | Grp. 2 | Baa.co.jp | No |
| Aab.A.Co.Jp | Grp. 1 | | | No |
| Aac.A.Co.Jp | EXT 103 | EXT 104 | | Yes |

|          |            |
|----------|------------|
| EXT 102  | Aaa.B.Co.Jp |
| EXT 103  | Aab.B.Co.Jp |
| EXT 104  | Aac.B.Co.Jp |

PRIVATE BRANCH EXCHANGE

This application is a continuation of U.S. patent application Ser. No. 11/059,272, filed Feb. 16, 2005, which is a continuation of U.S. patent application Ser. No. 09/948,267, filed Sep. 6, 2001, now U.S. Pat. No. 6,952,467, issued Oct. 4, 2005, the entire disclosures of which are incorporated herein by reference.

FIELD OF THE INVENTION

The present invention relates to a private branch exchange (PBX) for transmitting and receiving E-mails through a network such as the Internet.

BACKGROUND OF THE INVENTION

Communication with E-mails through the Internet has rapidly been spread worldwide. E-mails including common text data and audio data can be transmitted and received by personal computers including a modem and a Local area network (LAN) interface coupled to a network such as the Internet or the LAN. Other communication apparatuses with display such as facsimiles coupled to a telephone network can transmit and receive E-mails through providers.

Japanese Patent Laid-open Publication 11-205457 discloses a communication system where E-mails are displayed on a character display of each extension telephone linked via a computer telephony integration (CTI) interface to a private branch exchange (PBX) without a mail server. A conventional PBX has a function of transferring an E-mail received from the outside to one of extension telephones in addition to a basic function of speaking with other the extension telephones. However, such a conventional PBX may be disadvantageous for users to easily operate it to exchange E-mails between the extension telephone and an outline telephone.

SUMMARY OF THE INVENTION

A private branch exchange (PBX) which allows extension telephones or dedicated telephones to adequately handle E-mails received through a network is provided.

The PBX includes: an interface for communicating through the network; a mail server for receiving and storing a mail; an extension interface for exchanging a communication signal including an audio signal and control signal with an extension telephone terminal; a database for storing a mailing address of a received mail and the extension number of the extension telephone terminal corresponding to the address; an examining unit for examining whether or not the mailing address contained in the received mail received with the mail server through the network is registered in the database; and a controller for, when the mailing address of the mail is registered in the database, informing the extension telephone terminal of the extension number allocated to the mailing address of the mail.

DETAILED DESCRIPTION OF THE PREFERRED EMBODIMENTS

Figure 1:
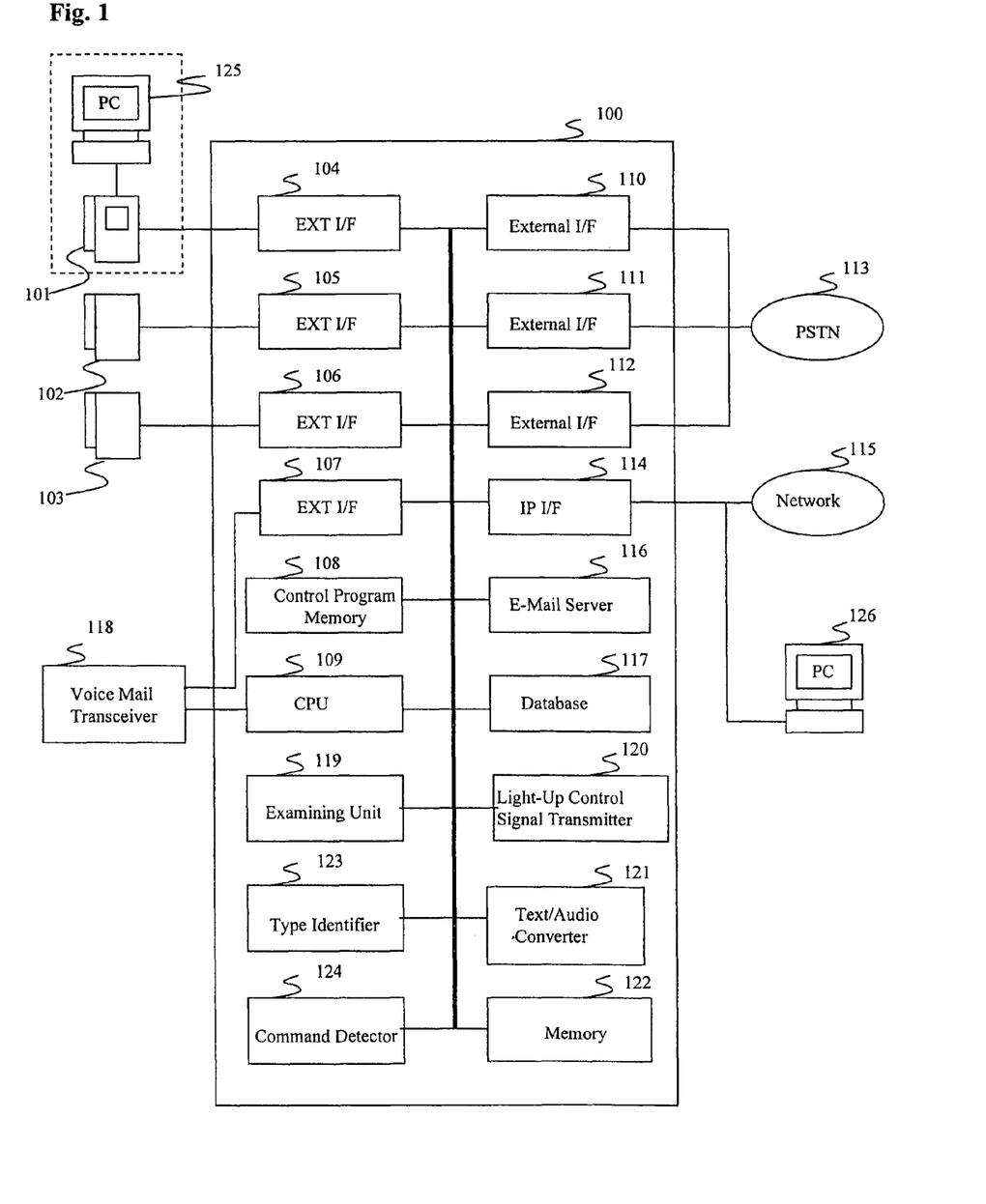
FIG. 1 is a functional block diagram of a private branch exchange (PBX) system including a PBX according to an embodiment of the present invention.

FIG. 1 is a functional block diagram of a private branch exchange (PBX) system according to the present invention. A PBX 100 for connecting to a network 115 and a public service telephone network (PSTN) 113 includes extension interfaces (I/F) 104 to 107 connectable to extension telephones such as digital telephones or analog key telephones, a control program memory 108 storing a program for controlling the PBX 100, and a central processing unit (CPU) 109, a controller, for controlling an overall operation of the PBX 100.

Outline interface (I/F) 110 to 112 are connectable to a digital or analog switching station over the PSTN 113. An Internet protocol interface (IP I/F) 114 is connectable to the network 115 such as a local area network (LAN) or the Internet. An E-mail server 116 transmits and receives E-mails between the PBX 100 and the network 115 and storing the E-mails transmitted or received. A database 117 stores destinations of E-mails. A voice mail transceiver 118 transmits and receives voice mails. The transceiver 118 is connected to one of the extension I/Fs for exchanging audio signals with the other external lines and exchanging digital control signals with the other extensions to record and play back messages or other information addressed to the extensions. An examining unit 119 retrieves data from the database. A light-up control signal transmitter 120 transmits a signal to light up a message-waiting lamp mounted on each telephone. A text/audio converter 121 converts text data into audio data and vice versa. A memory 122 stores the converted text data and the converted audio data. A type identifying unit 123 identifies a type of each telephone. A command detector 124 detects various commands such as key operation data from the telephones.

A digital telephone 101 operating as the extension telephone such as a digital key telephone is connected to one of the extension I/Fs for exchanging audio signals and control signals with a digital signal with the extension I/F. An analog single line telephone 102 is coupled to one of the extension I/Fs for exchanging call signals and audio signals with the extension I/F in the form of an analog signal. An analog key telephone 103 is coupled to one of the extension I/Fs for exchanging audio signals in the form of an analog signal and exchanging control signals in the form of a digital signal with the extension I/F. A computer 125 is coupled via an USB port or the like to the digital telephone 101 and may be coupled to a network such as the LAN. A computer 126 is coupled with a network such as the Internet or LAN.

Figure 2:
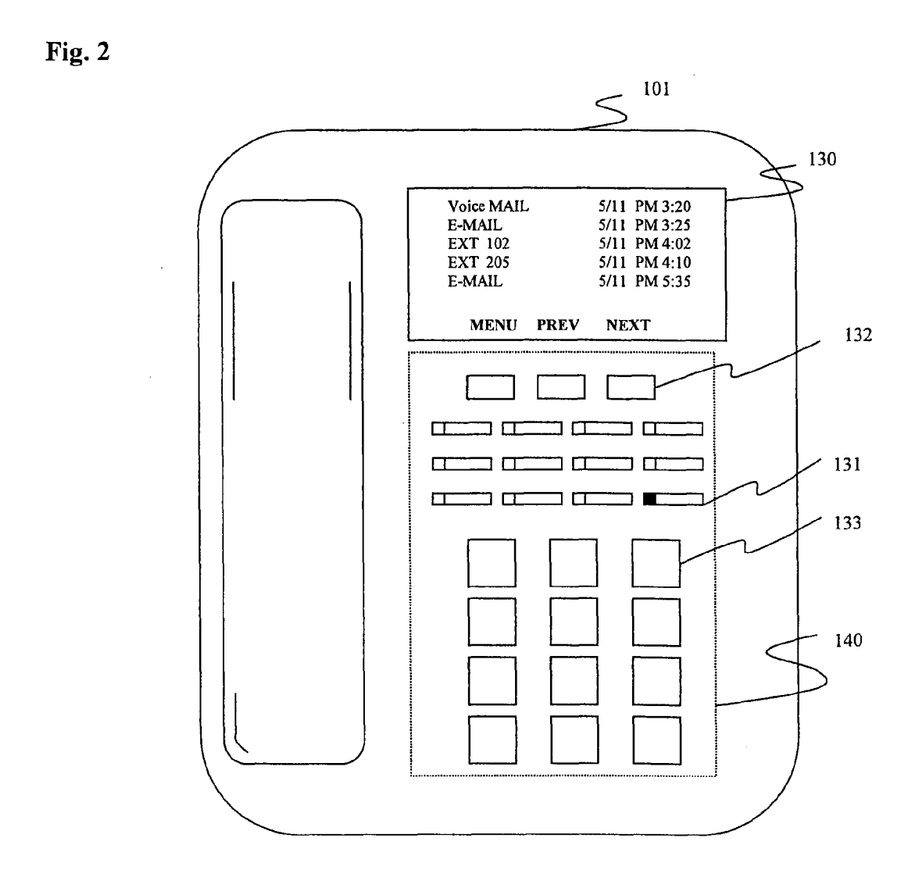
FIG. 2 is a plan view of a dedicated telephone included in the PBX system.

FIG. 2 is a plan view of the digital telephone 101 included in the PBX system according to the embodiment. The digital telephone 101 has a display 130 such as an LCD and flexible keys 131 capable of being allocated to particular functions arbitrarily. The flexible keys 131 may be allocated as an external key (CO key) for displaying a state of the external line and connecting to the external line, an extension key (Ext key) for displaying a state of the extension and connecting to the extension line, and a message waiting lamp key for lighting up when a voice mail from the voice mail transceiver 118 or the other extension or an E-mail from the network 115 is received. Control keys 132 are used for operating issues displayed on the display 130. Numeral keys 133 are used for entering a command and telephone number.

Figure 3:
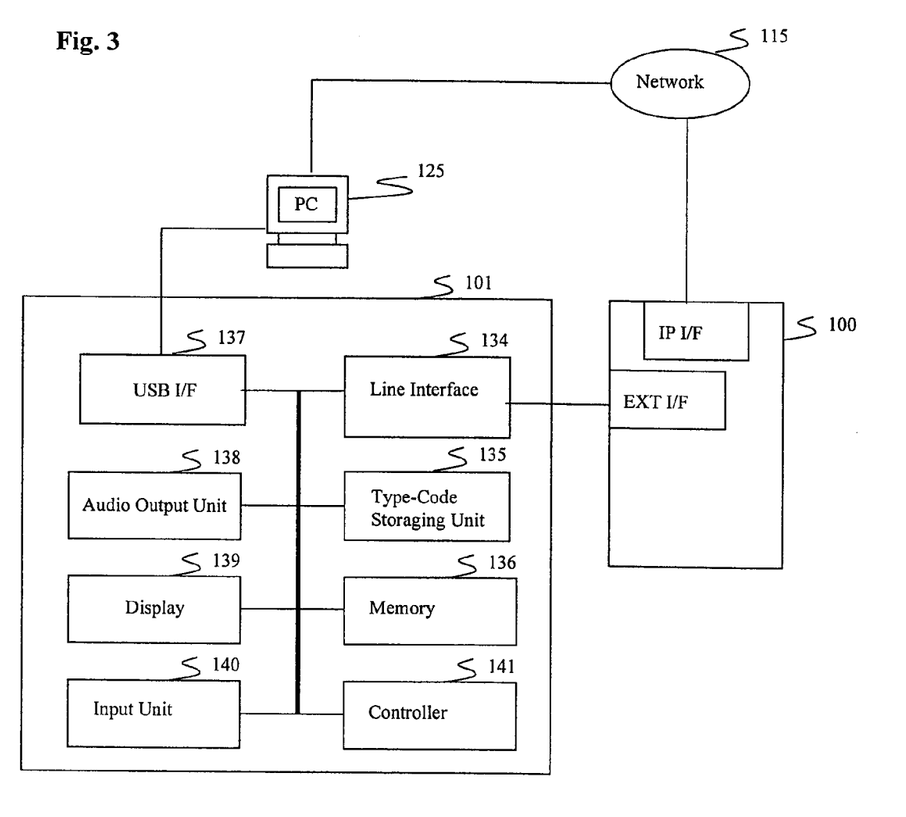
FIG. 3 is a functional block diagram of the dedicated telephone.

FIG. 3 is a functional block diagram of the digital telephone according to the embodiment. A line interface 134 is coupled to the corresponding extension I/F of the PBX 100 for exchanging audio data and control data in the form of digital signal with the extension I/F. A type-code storing unit 135 stores the type of the digital telephone 101 of the types allocated to the dedicated telephones. A memory 136 is used for a telephone number book for the digital telephone and used for controlling the operation. A universal serial bus (USB) interface (I/F) 137 is connected between the digital telephone 101 and a computer.

A user, since the digital telephone is connected via the USB I/F with the computer 125, can operate the digital telephone 101 from a display of the computer 125 and can also receive desired data from the PBX 100. Accordingly, the user can control transmitting and receiving data on the digital telephone 101 using the computer 125. The command signal from the computer 125 to the PBX 100 is transferred from the USB I/F 137 to the CPU 109 controlling the signal through line interface 134 and extension I/F 104. In response to the command signal, the CPU 109 controls an operation of the digital telephone 101 and supplies, to the computer 125, the operation data including the transmitted and received data via the digital telephone 101.

An audio output unit 138 such as a speaker outputs an audio signal received from the PBX 100 as sounds. A display 139 such as an LCD displays various information. An input unit 140 includes the flexible keys, function keys, and numeral keys.

The computer 125 is coupled via a LAN I/F to the network 115 for exchanging E-mails with the E-mail server of the PBX 100 or other E-mail servers over the network 115.

An operation of the PBX system having the foregoing arrangement will be explained below.

Figure 4:
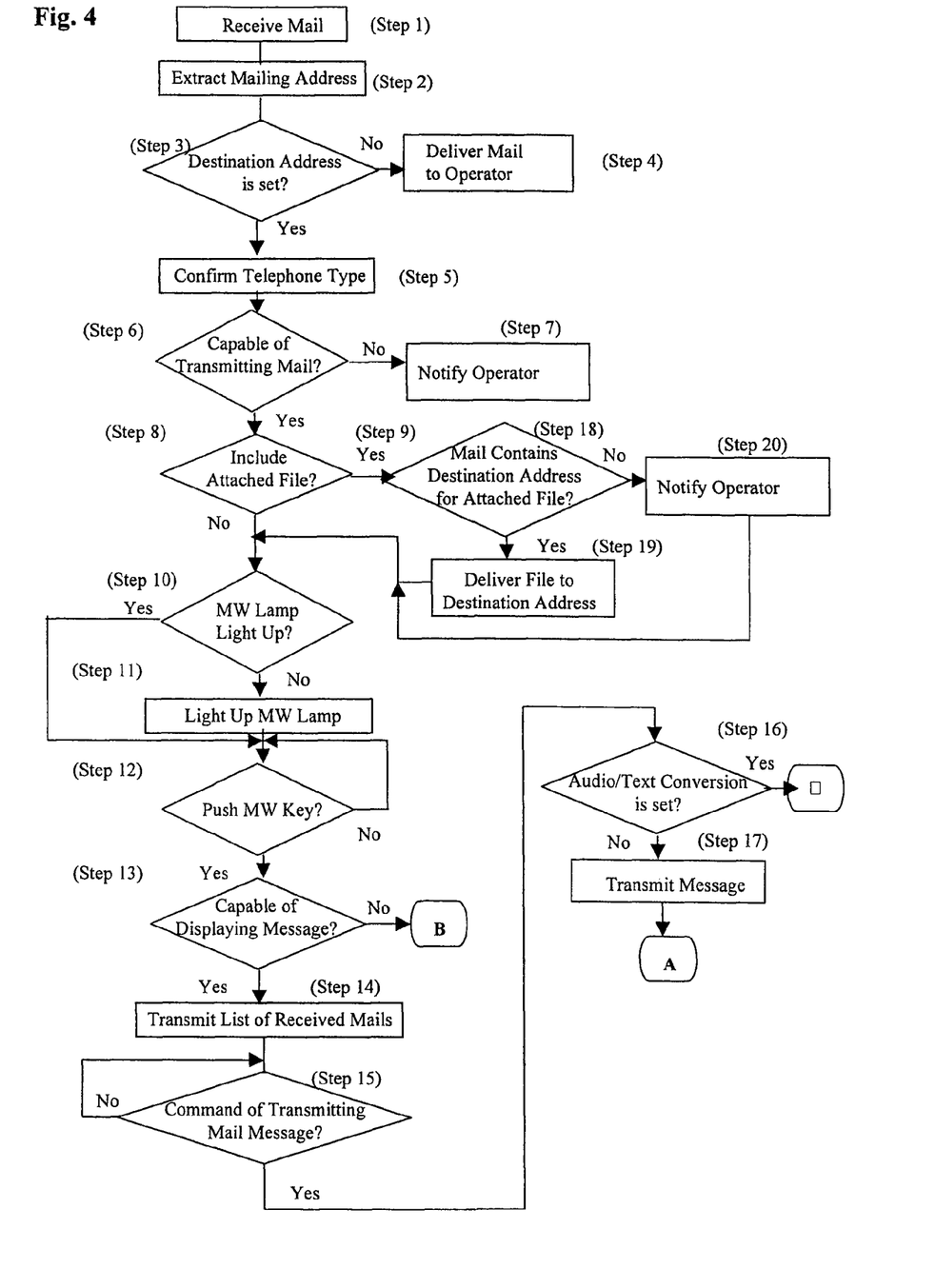
FIGS. 4 to 9 are flowcharts showing an operation of the PBX.

FIG. 4 is a flow chart showing an operation of the PBX 100. An E-mail from the network 115 received by the PBX 100 is transferred via the IP interface 114 to the E-mail server 116 in the PBX 100 (Step 1). The server 116 detects information from the E-mail and stores a message or main data and appendix data including a mailing address as destination information in a memory in the server 116 (Step 2). It is examined whether or not the destination address of the E-mail (for example, Aaa.A.Co.Jp) coincides with address registered in the database 117.

Figure 10:
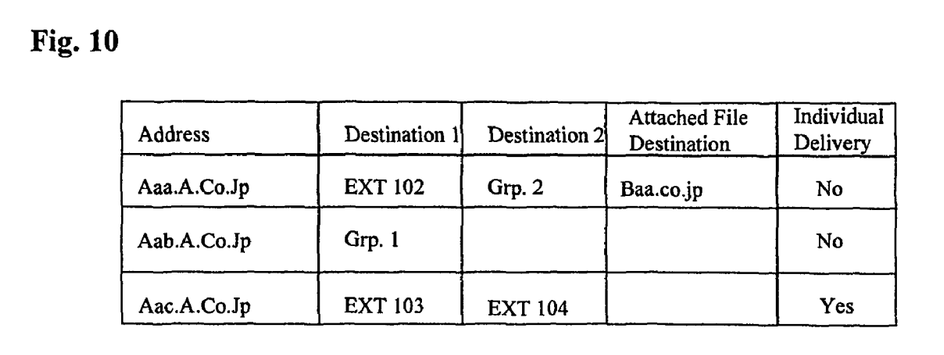
FIG. 10 is a diagram of a memory structure of a destination database in a database of the PBX.

Referring to FIG. 10, the database 117 contains a table of the destinations set by the user through a device, e.g. a computer connected to the PBX. The examining unit 119 examines whether the destination address of the E-mail is set or not (Step 3). The table in the database 117 shown in FIG. 10 includes extension numbers and group of the extensions in the PBX system and an E-mail address of a computer 126 in the PBX system to which E-mails are delivered for the destination address. Also, the table may include a group of (attachment destination) addresses to which the attached files of E-mails are delivered.

When the examining unit 119 recognizes that the destination address of the E-mail is not set in the database 117, the E-mail is transferred to a computer of a predetermined operator (not shown) (Step 4). Forwarding the E-mail to the operator may arbitrarily be implemented depending on the installation of the PBX system and arrangement of operators. In case that the computer operated by the operator is linked to the network 115, a mailing address of the computer is registered in the database 118 for allowing the E-mails to be received. If the operator has no computer linked to the network 115 but a switching board or a dedicated extension telephone, the E-mail may be delivered to them.

When the examining unit 119 recognizes that the destination address of the E-mail is set in the database 117, the type of the extension telephone connected to the extension I/F for the destination address is identified (Step 5). An extension number is allocated to the extension interface. For example, in case that the database 117 is set as shown in FIG. 10, when the destination address of an E-mail is "Aaa.A.Co.Jp", a destination "EXT.102" (extension number '102'), "Grp.2" (extension group "2"), and Baa.Co.Jp (the mailing address of the attached file) are read, and the type of the telephone 102 in the group 2 connected to the extension I/F is identified.

For identifying the type of the telephone, a common public line telephone or a dedicated telephone, a controller 141 in the extension telephone 101 responds by sending a type code stored in the type-code string unit 135 in response to a type data response command signal released from the type identifier 123 instructed by the CPU 109 in the PBX 100. The type of the extension telephone may be identified and stored when the extension telephone is connected to the extension I/F. In this case, the type data response command signal is not necessary whenever an E-mail is received, and the type of the telephone can be identified through referring stored results of the examination.

Then, four types of the telephone to be connected to the PBX 100 will be described below.

The telephone of the first type is a PBX-dedicated key telephone with a display. The telephone has a display and functional keys including a message waiting key, an external line key, an extension key, and a hang-on key. The telephone includes an analog key telephone with four lines including two communication signal lines and two control signal lines, and a digital key telephone with two lines including a communication signal line and a control signal line. The signals to be transmitted from the PBX to the dedicated telephone include a call signal for notifying the receiving a call, a display signal for the display, and a type data response demand signal for identifying the type. The signals to be transmitted from the dedicated telephone 101 to the PBX carry data about an operation with the function keys, an on-hook and off-hook operations, and the type of the telephone.

The telephone of the second type is a PBX-dedicated telephone which does not have a display. The telephone has a substantially identical function to that of the first type except having no display.

The telephone of the third type is a common single line telephone 102 which does not have a display or a message waiting lamp. The telephone of this type, since having a communications line but not a signal line, is disabled to receive control signals from the PBX and transmit the type code to the PBX.

The telephone of the fourth type is a telephone equipped with a message waiting lamp which is substantially identical in the function to that of the third type.

The common single line telephone does not have a function for responding the type data response demand signal transmitted from the PBX. The dedicated telephone can respond to the demand and transmit the type code allocated to the telephone of the first or second type to the PBX 100. Upon receiving the type code, the type identifier 123 in the PBX 100 examines whether the telephone is the LCD equipped dedicated telephone or not. The PBX identifies intermittently the type of the telephone at predetermined intervals.

Then, it is examined whether or not a telephone of the destination is that capable of transmitting an E-mail (Step 6). When the telephone connected to the extension interface to which the E-mail is delivered is not the LCD equipped dedicated telephone 101 (of the first type) but the dedicated telephone with no display (of the second type), the common telephone (of the type three), or the telephone with the message waiting lamp 103 (of the fourth type), text data of the E-mail is not displayed. In this embodiment, as far as a message of the E-mail is not converted into texts/audio, the CPU 109 in the PBX 100 may deliver the E-mail directly to an operator computer without a notice of the arrival of a message (i.e. fighting up the LED of the message waiting key) (Step 7). This inhibits the message of the E-mail from being failed to acquire despite the LED of the message waiting key being not lit up due to an incorrect setting of the database or a replacement of the registered telephone of a different type.

When a destined extension telephone is the dedicated telephone 101 having a display such as an LCD, the identifier 123 identifies, on the basis of the response signal supplied by the extension telephone to which the E-mail is delivered, that the extension telephone is the dedicated telephone 101 having a display. And then, a controller examines whether a received E-mail includes an attached file or not (Step 8). If the E-mail contains the attached file and a destination address of an extension telephone having a display to which the file is delivered, the attached file is delivered (Step 19). If the E-mail does not address a telephone which does not have a display, the controller delivers the file and other information to the console of the operator (Step 20).

After the file of information is forwarded at Step 19, if it is recognized that the E-mail does not include the attached file at Step 20, the PBX 100 notifies the extension telephone 101 of the arrival of the E-mail addressed to the telephone 101. Simultaneously, the controller 109 confirms that the message waiting (MW) lamp key does not light up (Step 10) and demands to receive a signal for lighting up the MW key (Step 11). When the E-mail includes an attached file of which the destination is set, the PBX 100 delivers the file to the destination (Step 9). If the destination of the attached file is not set, the file is forwarded to the computer of the operator.

The MW key indicates that the dedicated telephone 101 receives the response demand from another extension telephone and receives a message from a voice mail transceiver 118. The MW key, in this embodiment, is commonly used for notifying the arrival of an E-mail.

Therefore, when viewing the LED of the MW key being lit up, a user can acknowledge that a text E-mail, a voice mail from the voice mail transceiver, and a message for the response demand from another extension telephone are received.

After the arrival of the E-mail from the PBX 100 has been notified at Step 11, it is waited that the MW key is pressed down by the user (Step 12). When the MW key is pressed down, the controller examines, in the same manner as of Step 6, whether or not the extension telephone to which the E-mail is forwarded is capable of displaying a message (Step 13). After confirming the telephone is capable, the controller transmits a list of the received mails to the extension telephone (Step 14).

Figure 11:
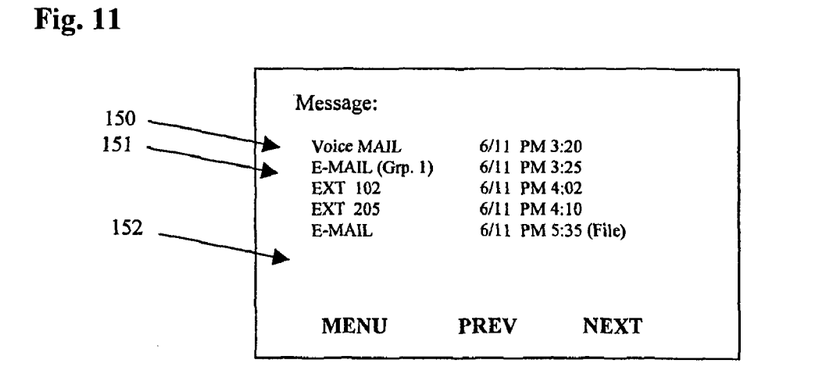
FIG. 11 illustrates a received message displayed on the dedicated telephone.

Referring to FIG. 11, an example of the list including five messages displayed on the LCD screen of the digital telephone 101 will be explained below. A message 150 "Voice mail 6/11 PM 3:20" means that a voice message is delivered at 3:20 PM on June 11th to the voice mail transceiver 118. A message 151 "E-mail (Grp1) 6/11 PM 3:25" means that an E-mail from the network 115 is delivered at 3:25 PM on June 11th to the extension group 1. A display "Grp" is tagged to a message which is addressed to one group of extension terminals. For example, when thirteen extension telephones 101 to 113 are tagged with "Grp1", they all can receive the E-mail. A display "File" means that the E-mail includes an attached file. The attached file may include an image data file, a music file, and a specific document data file. In this embodiment, the digital telephone 101 cannot read a content of E-mail in the form of text. Therefore, it is set so that the digital telephone 101 can not open the attached file. However, the digital telephone 101 may be set so as to open a specific data file.

As shown in FIG. 11, as the MW key is pressed by the user, the extension telephone displays a historical list of the E-mails (Step 14). Then, the controller 109 waits for a transmission command from a user by selecting one of the E-mails on the list (step 15). When the user send the command, the PBX examines whether the conversion of a selected message into an audio data is preset or not (Step 16). If not, text data of the message is retrieved by the E-mail server 116 and transmitted to the extension telephone (Step 17).

For example, in the case that the user selects the message 152 "E-mail 6/11 PM 5:35 (File)", a command detector 124 of the PBX, upon receiving a mail transmission command from the extension telephone, extracts data of the E-mail from the E-mail server 116 and delivers it to the telephone. Then, the message of the E-mail from the PBX 100 is displayed on the display of the extension telephone as shown in FIG. 12.

Figure 12:
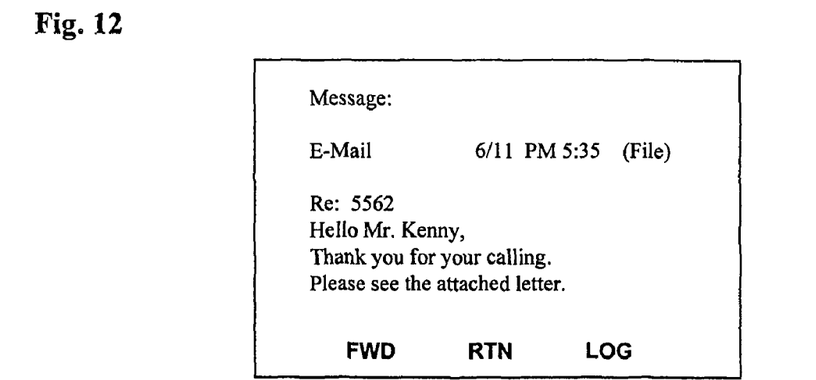
FIG. 12 illustrates a received E-mail displayed on the dedicated telephone.

When the E-mail with the attached file has been displayed on the display of the digital telephone 101 as shown in FIG. 12, and the key 132 corresponding to letters "FWD" on the LCD display is pressed, a list of the predetermined destinations is displayed. The list may include the mailing address and telephone number of the extension telephone equipped with a display and connected to the PBX 100. This allows the user to select a desired destination from the list and deliver the E-mail to the destination. For returning back the E-mail to a sender, the user can select "RTN" on the display and enter a message in a text file with using the numeral keys. When the E-mail includes an attached file, the mail may be returned back after the attached file is automatically deleted.

If "LOG" on the LCD display is selected, the E-mail is inhibited for a predetermined period from being deleted from the database 117 of the PBX 100. This allows the user to review the received messages through pressing the message waiting key when all the messages have been checked and the key lamp is lit off. The PBX 100 may store a message for a predetermined period even when the "LOG" is not selected.

The message can be forwarded to a desired extension or address number when the digital telephone 101 receives no call after a predetermined period from the arrival of the preceding message from the PBX 100 in case that the transfer of the message to another extension telephone or mail address upon knowing no user available is programmed or when the transfer of the message is set by the user entering the command through the keyboard of the telephone 101.

Figure 5:
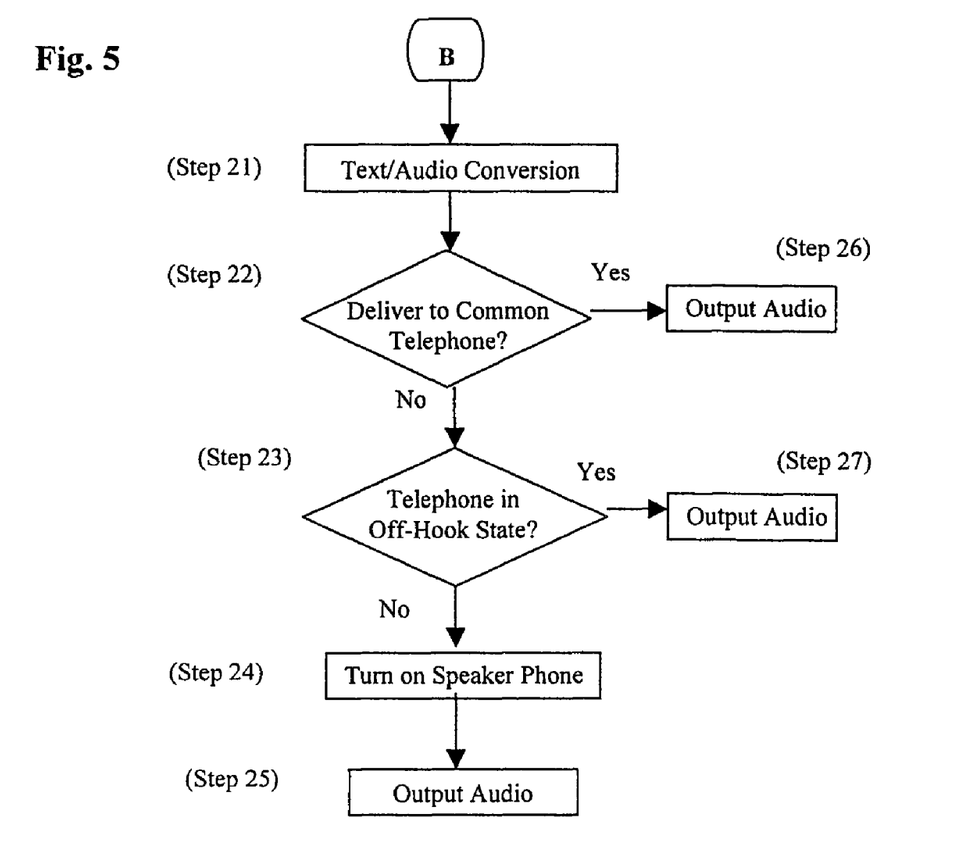

Referring to FIG. 5, an operation of the controller 109 will be explained especially in the cases that the extension telephone is not equipped with a display, and that the conversion to audio sounds is set at Step 16. A message of the E-mail is extracted by the controller 109 from the E-mail server 116 and converted into audio data by the text/audio converter 121 (Step 21). Then, the audio data is stored in the memory 122. Furthermore, the controller 109 determines, on the basis of the result of the type identifier 123, the type of the extension telephone to which the audio data is delivered (Step 22).

When the type is a common telephone, the audio data of the message is transferred from the memory in the PBX via the extension I/F to the extension telephone where the data is output from a speaker as sound (Step 26).

After the extension telephone is identified with the key telephone by the type identifier 123, the CPU detects whether or not the telephone is in an off-hook state (Step S23). When the telephone is in the off-hook state, the audio data is output from the speaker of the extension telephone as sound (Step 27). If the extension telephone is not in the off-hook state, the audio data is output from the speaker phone as sound (Step 25) by transmitting a signal for turning on a speaker phone to the extension telephone (Step 24).

Figure 6:
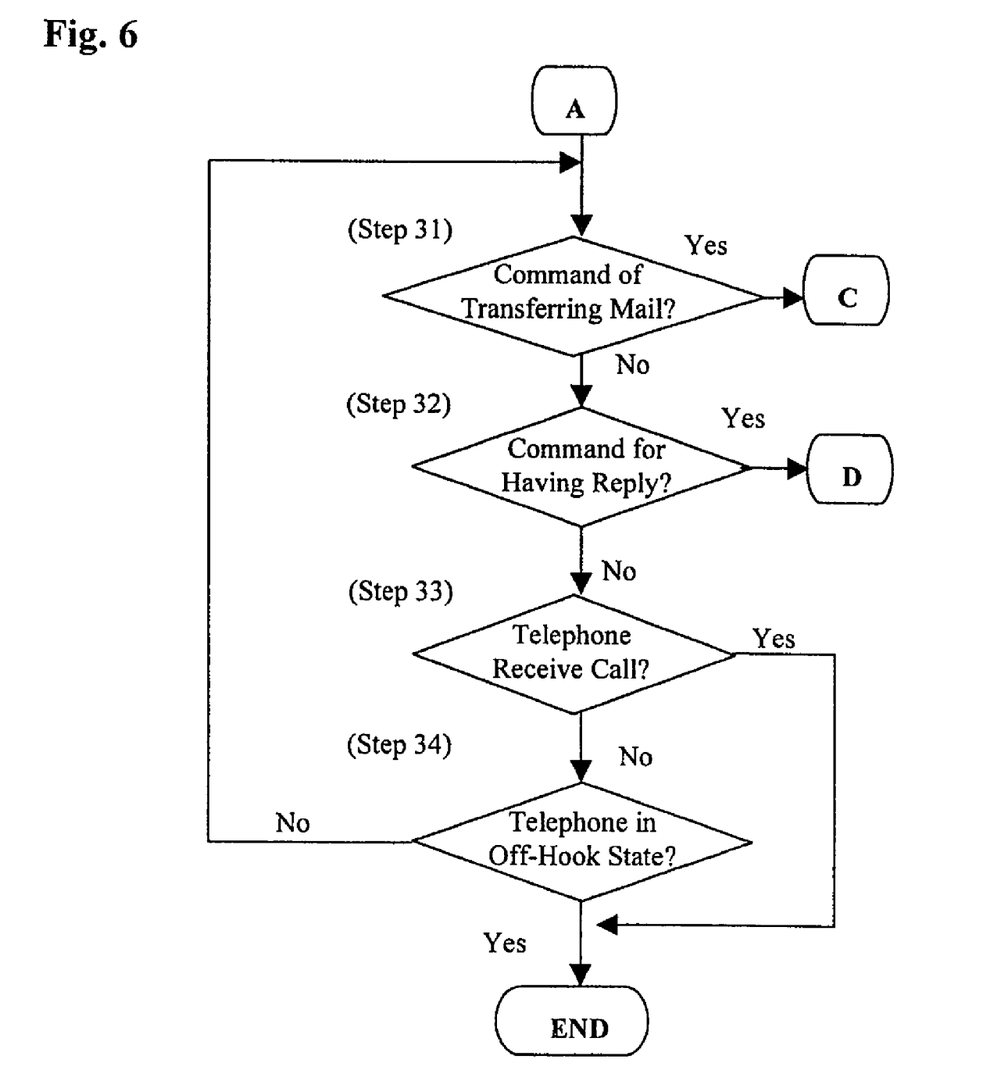

Referring to FIG. 6, an operation in a case that the message of the E-mail is displayed as text data on the telephone at Step 17 will be described below. In the state of displaying the message, the controller 109 waits for a command for transfer of the message and a command for having a replay received from the extension telephone (Step 31 and Step 32). Then, when the extension telephone receives a call or turns to the off-hook state, the PBX displays a message screen and a call screen on the display, respectively (Step 33 and Step 34). In case that a message of a mail is displayed on the display as shown in FIG. 12, when a call is received or made, a screen of the received call or transmitted call is displayed.

Figure 7:
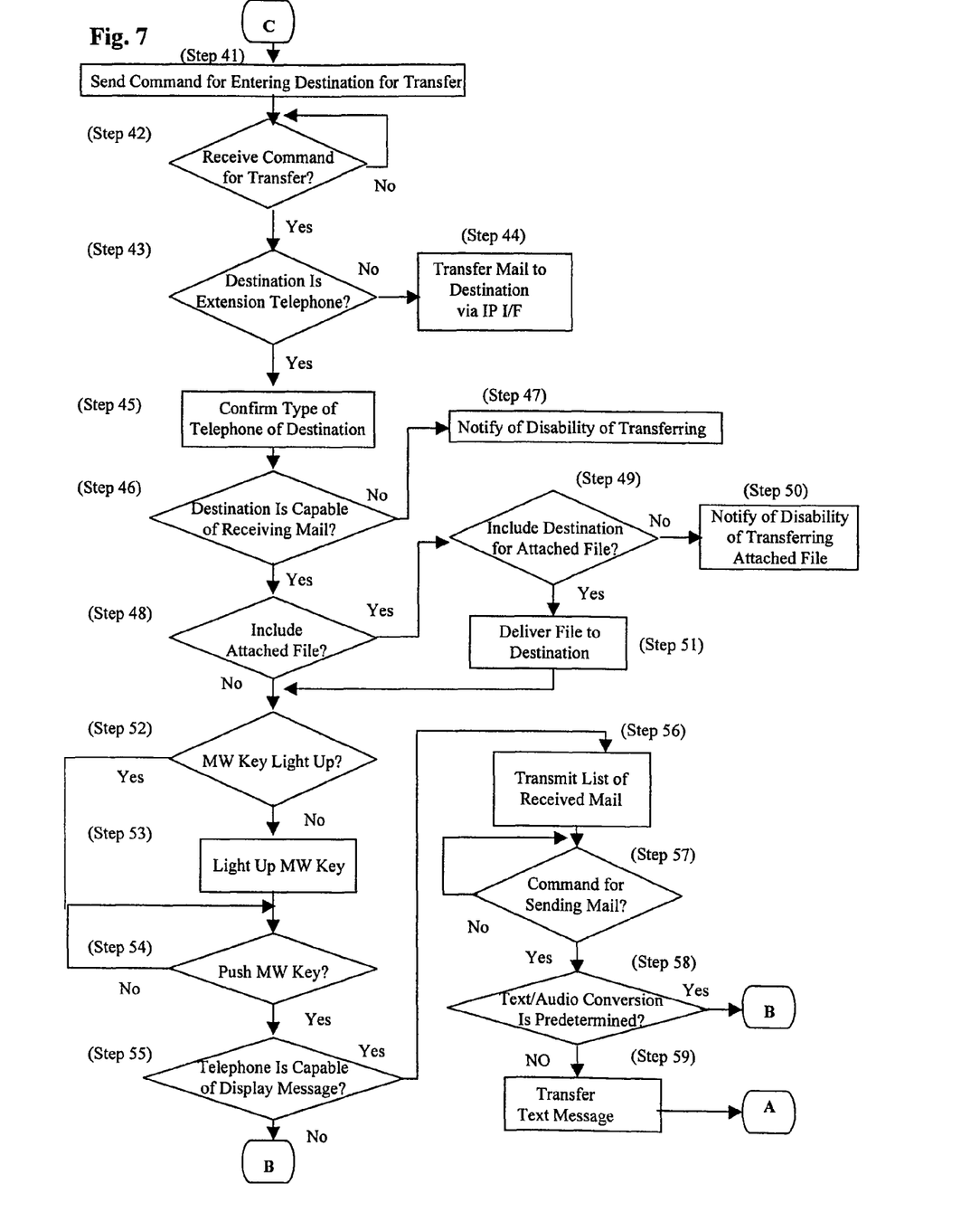

Referring to FIG. 7, an operation in case that the command for transfer of a message is made at Step 31 will be described below. The controller sends, to the extension telephone, a command of entering data regarding a destination to which the message is transferred (Step 41), and waits for destination data and a command for starting the transfer of the message from the telephone (Step 42). Upon receiving the command for starting the transfer, the controller examines whether or not the destination to which the message is transferred is one of the extension telephones (Step 43). When the controller judges that the destination is a communication apparatus such as an external telephone and personal computer, the message is transferred via the IP I/F 112 to a predetermined address (Step 44).

When recognizing at Step 43 that the destination is one of the extension telephones, the controller identifies a type of the telephone to be addressed (Step 45). The controller, then, examines whether or not the extension telephone of the identified type is capable of receiving an E-mail (Step 46). If the telephone is not capable, the controller notifies the telephone of disability of a transfer of the mail (Step 47).

When recognizing at Step 46 that the telephone is capable of receiving the mail, the controller examines whether or not the mail to be transferred includes an attached file (Step 48). When the mail includes an attached file, and the extension telephone to which the mail is delivered has a destination address for the attached file, the attached file is transferred to the destination extension (Step 51). If the extension telephone does not have the destination address for the attached file, the controller displays a notice of disability of a transfer of the attached file on the display of the extension telephone which requests the transfer (Step 50).

When it is recognized at Step 48 that the mail does not include an attached file, or after the attached file is transferred with the operation at Step 50 and Step 51, the controller examines whether or not the MW key on the extension telephone to which the mail is forwarded remains lit up (Step 52). When detecting that the MW key is not lit up, the controller transmits a command signal for lighting up the MW key (Step 53). When detecting, at Step 53 or Step 52, that the MW key remains lit up, the controller detects a signal indicating that the user presses the MW key (Step 54). The controller then examines whether or not the extension telephone is capable of displaying the message (Step 54). When the telephone is capable, a list of the received mails is transmitted to the telephone (Step 56).

Then, the controller waits for a command of sending a mail selected by the user (Step 57). When receiving the command, the controller examines whether or not the conversion to audio data is set (Step 58). If not, the text message of the mail is transferred to the extension telephone (Step 59).

Figure 8:
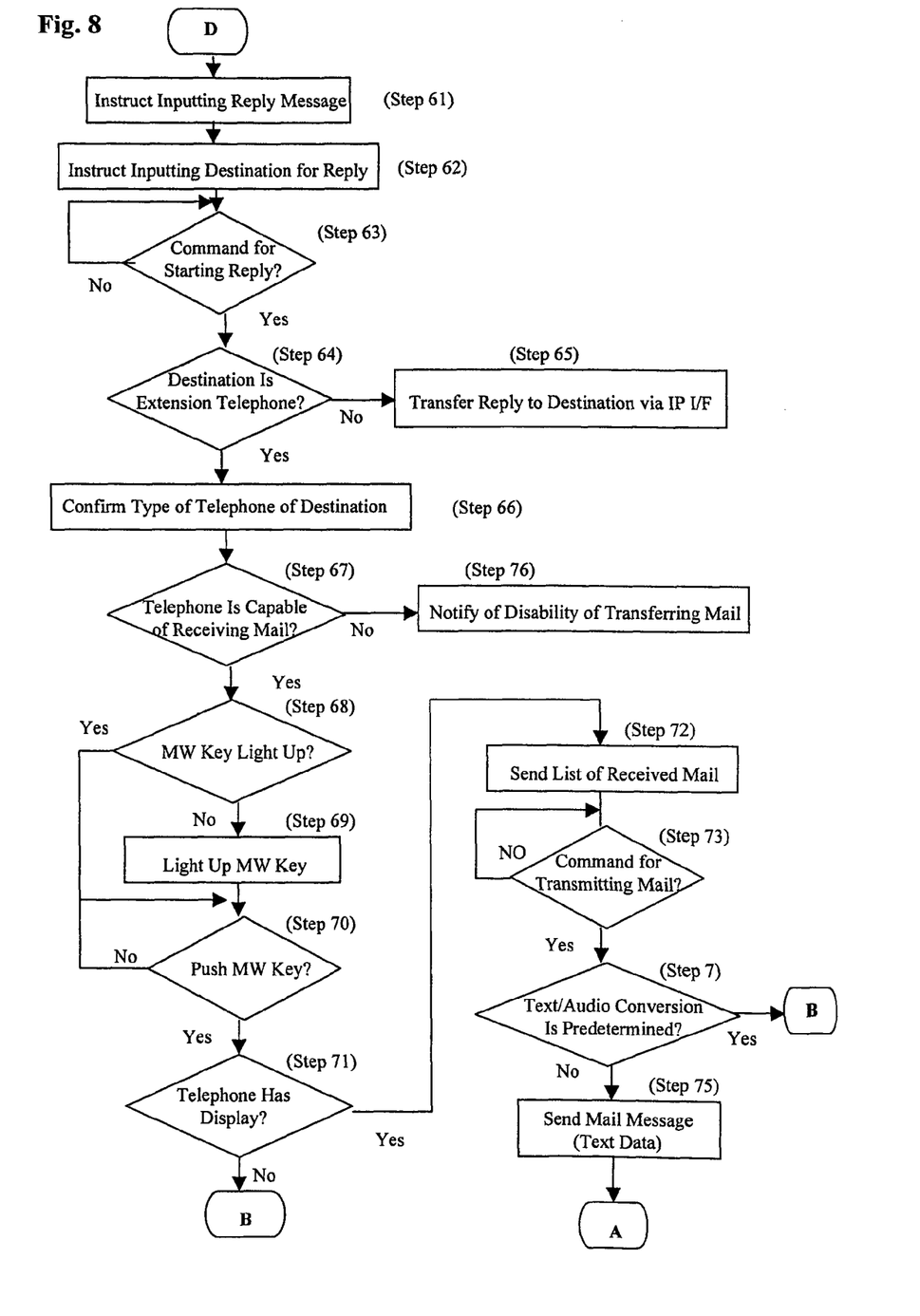

Referring to FIG. 8, an operation in a case that the request for reply is received at Step 32 will be explained below. When receiving the request for reply at Step 32, the controller instructs to input a reply message (Step 61). Then, the user inputs the reply message (Step 63). Further, the controller sends the extension telephone data of a screen to request to input a destination of the reply to instruct to input the destination, and waits for an input by the user (Step 64). The controller waits for a command of starting the reply from the user (Step 63).

When receiving the command of starting the reply entered through the telephone by the user, the controller examines whether or not the destination to which the replay is addressed is one of the extension telephones (Step 64). If the destination is a communication apparatus such as an external telephone and personal computer, the reply message is transferred via the IP I/F to the external destination (Step 65). When recognizing that the destination is one of the extension telephones, the controller identifies the type of the destination telephone (Step 66) and examines whether or not the destination telephone is capable of receiving the mail message (Step 67).

When recognizing that the mail message is not accepted, the controller notifies the telephone of disability of transfer of the message (Step 76). When recognizing that the destination telephone is capable of receiving the mail message, the controller examines whether or not the MW key of the destination telephone remains lit up (Step 68). If not, the controller transmits a signal for lighting up the MW key (Step 69).

While the MW key of the destination telephone remains lit up, the controller examines whether the MW key is pressed down or not (Step 70).

When detecting that the MW key is pressed down, the controller examines whether the destination telephone has a display or not (Step 71). When it has a display, the controller sends a list of received mails to destination telephone (Step 72). Then, the controller waits for a command of transmitting the mail message from the user (Step 73). When receiving the command, the controller detects whether or not the conversion into audio data is set (Step 74). If it is not set, the controller sends a text data of the message to the destination telephone (Step 75).

Another method of controlling the private branch exchange (PBX) according to the embodiment will be described.

Figure 9:
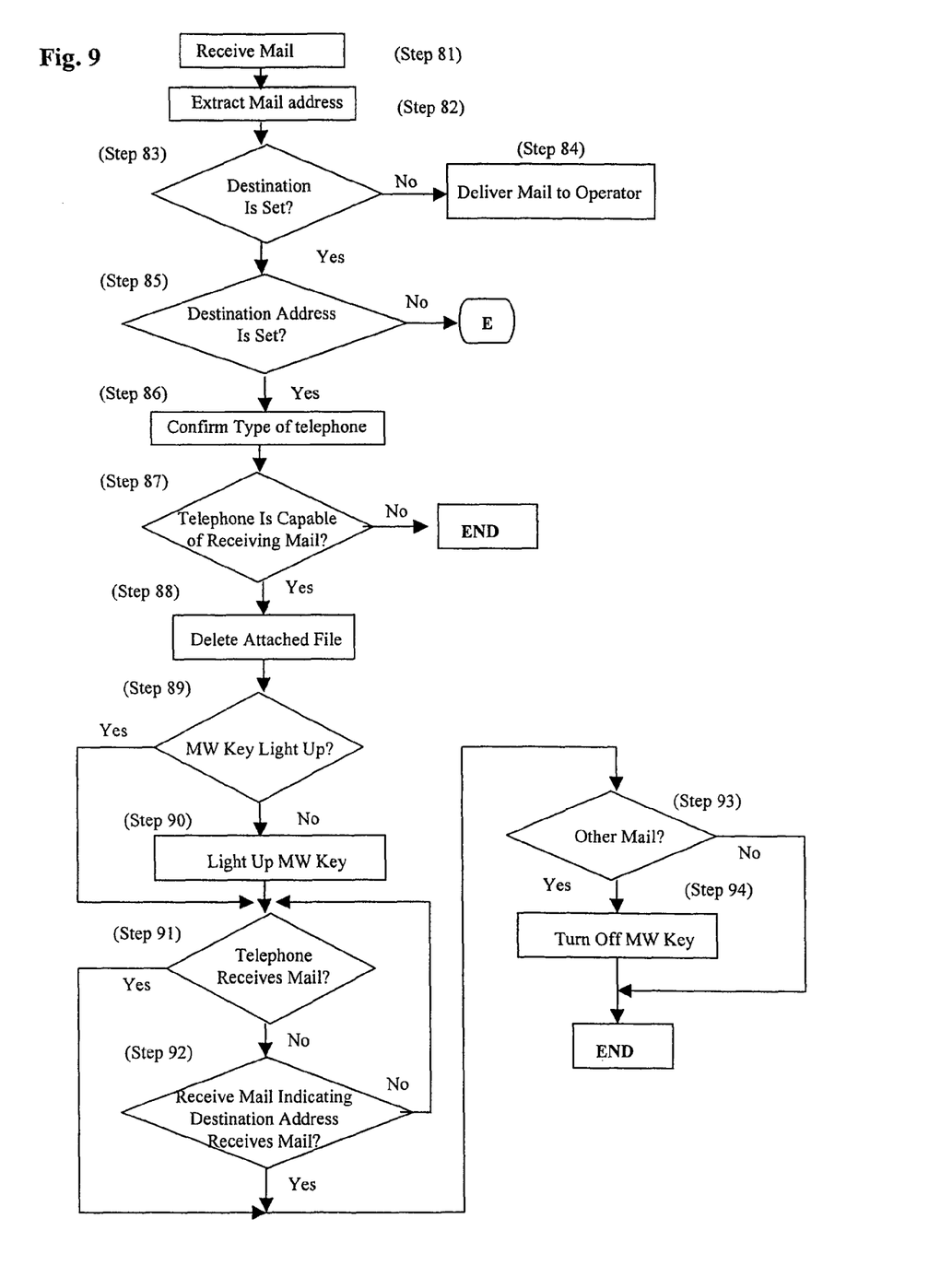

FIG. 9 is a flowchart showing an operation of the PBX 100 in the method. An E-mail addressed to one of the telephones connected to the PBX 100 is received via an Internet protocol interface (IP I/F) 114 by an E-mail server 116 in the PBX 100 (Step 81). The server 116 stores a main message and appendix data such as a mailing address (a destination address) of the E-mail (Step 82). The examining unit 119 then examines whether or not the destination address of the received E-mail (for example, Aaa.A.Co.Jp) is registered in a database 117. The database 117 contains a table of the destination addresses set by the user as shown in FIG. 10. An address examining unit examines whether or not the destination address of the received E-mail is listed in the table (Step 83).

As shown in FIG. 10, the table in the database 117 may include an extension number, group of extensions in the PBX system, and E-mail address of a computer 126 corresponding to the destination address to which an E-mail is delivered. The table may further include a group of addresses or attached file destinations to which the attached files of E-mails are forwarded.

When the address examining unit 119 recognizes that the destination address of the E-mail is not set in the database 117, the E-mail is transferred to a computer of an operator (not shown) (Step 84).

Figure 13:
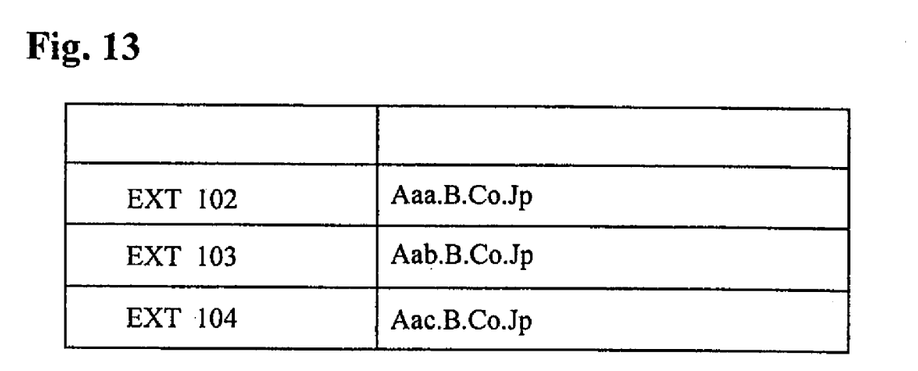
FIG. 13 illustrates the relationship between extension terminals and addresses.

When it is judged at Step 85 that a destination address of the E-mail and the extension terminal to which the E-mail is forwarded are set in the database 117, and when the extension terminal is allocated to the destination address, the E-mail including an attached file are transferred to a communication device such as a personal computer (Step 86). The relationship between the extension terminals and the addresses is shown in FIG. 13. For example, the extension number "102" is allocated to an address "Aaa.B.Co.Jp". The controller turns on the MW lamp of the extension telephone and delivers the E-mail addressed to "Aaa.B.Co.Jp".

Then, a type of the telephone is confirmed from the address of the telephone to which the E-mail is delivered (Step 87). When the type of the telephone is capable of receiving the E-mail, the controller instructs to delete the attached file of the E-mail from the E-mail server 116 (Step 89).

The controller examines whether the MW key of the destination telephone remains lit up or not (Step 90). If not, the controller turn on the MW lamp. That is, the controller 109 sends light-up message data to the extension telephone through the extension I/F. The controller examines whether or not the telephone receives the E-mail (Step 91). When the telephone does not receive the E-mail, the controller examines, from data sent from the E-mail server, whether or not a mail indicating that the mail delivered at Step 85 is received from a device corresponding to the destination address (Step 92). The device corresponding to the destination address has a mailing program installed to send, to the PBX, an E-mail indicating to receive an E-mail when a content of an E-mail sent from the PBX. When the mail is received, the controller examines whether the telephone has another messages than the mail or not (i.e., whether the telephone has a message to be confirmed or not) (Step 93). If the telephone does not have a message to be confirmed, the controller turns off an LED of the MW key of the telephone (Step 94).

The LED of the MW key is turned on when the telephone has a message (an E-mail or voice mail) to be confirmed, and turns off when the controller judges that all message to be confirmed is confirmed. The PBX transfers an E-mail received at the E-mail server to the extension terminal addressed by the E-mail and a computer corresponding to the extension terminal. When the user opens the E-mail at the computer to which the E-mail is addressed before the E-mail is confirmed at the extension telephone, the computer send the E-mail server a notice mail of receiving the E-mail. The MW lamp of the extension telephone is turned off by the PBX in response to the notice mail. Therefore, the user does not have to confirm the E-mail on the extension telephone again even if the user has a dedicated telephone and a computer on a desk. Further, the E-mail can be stored and managed with the computer.

Many modifications and variations of the present invention are possible in the light of the above techniques. It is therefore to be understood that within the scope of the invention, the invention may be practiced otherwise than as specifically described.

What is claimed is:

1. A communication system comprising:
a plurality of extension telephones, a private branch exchange receiving a mail including a mail address over a network and transfers the mail, and a computerized device disposed corresponding to said private branch exchange,
said extension telephone including a notifier that said extension telephone has a message to be confirmed,
wherein said private branch exchange includes:
an interface configured to communicate with the network;
a mail server configured to receive and store the mail;
an extension interface configured to exchange a communication signal including an audio signal and a control signal with said extension telephones;
a first database configured to store extension numbers of said extension telephones and receivable mailing addresses corresponding to the extension numbers;
said computerized device having a destination address corresponding to the extension number of said extension telephone;
a second database configured to store the extension numbers of said extension telephones and the destination address of said computerized device corresponding to the extension number of said extension telephone;
an examining unit configured to detect whether or not the mailing address included in the received mail matches the receivable mailing address stored in said first database; and
a controller operable for notifying the extension telephone of receiving of the mail, and for transferring the received mail to said computerized device having the destination address responsive to said examining unit judging that the mailing address included in the received mail matches the receivable mailing address stored in said first database, and cancelling notifying said extension telephone of receiving the mail in case that the mail is opened at said computerized device.

2. A terminal telephone which transmits and receives a mail through a PBX and is coupled to a computerized device receiving the same mail as said terminal telephone receives, said terminal telephone having a notifier which notifies that said terminal telephone has a message to be confirmed,
wherein said notifier activates by receiving a notice of receiving a predetermined mail from the PBX and brings into a standstill of the activation thereof by receiving a notice from the computerized device through the PBX that the mail has been opened at the computerized device.

3. The terminal telephone according to claim 2, wherein said PBX has a first database storing an extension number of the terminal apparatus and a mailing address of the computerized device corresponding to the extension number of the terminal telephone and the terminal telephone receives the mail from the PBX based on the extension number of the terminal apparatus and the mailing address included in the mail corresponding to the extension number of the terminal apparatus.

4. The terminal telephone according to claim 2, wherein said PBX has a second database stores an extension number of the terminal telephone and a predetermined address of the computerized device corresponding to the extension number of the terminal telephone and the terminal telephone receives the notice from the computerized device through the PBX based on the extension number of the terminal telephone and the predetermined address corresponding to the extension number of the terminal apparatus.

5. A system comprising:
a PBX, a plurality of terminal telephones and a computerized device corresponding to at least one of the plurality of terminal telephones, said terminal telephone transmitting and receiving a mail through said PBX and being coupled to said computerized device receiving the same mail as said terminal apparatus receives,
wherein said terminal telephone has a notifier which notifies that said terminal telephone has a message to be confirmed, and
wherein said notifier activates by receiving a notice of receiving a predetermined mail from said PBX and brings into a standstill of the activation thereof by receiving a notice from said computerized device through said PBX that the mail has been opened at said computerized device.

6. The system according to claim 5, wherein said PBX has a first database storing an extension number of said terminal apparatus and a mailing address of said computerized device corresponding to the extension number of said terminal telephone and said terminal telephone receives the mail from said PBX based on the extension number of said terminal apparatus and the mailing address included in the mail corresponding to the extension number of said terminal apparatus.

7. The system according to claim 5, wherein said PBX has a second database stores an extension number of said terminal telephone and a predetermined address of said computerized device corresponding to the extension number of said terminal telephone and said terminal telephone receives the notice from said computerized device through said PBX based on the extension number of said terminal telephone and the predetermined address of said computerized device corresponding to the extension number of said terminal apparatus.

* * * * *